(12) United States Patent
Boothman et al.

(10) Patent No.: US 12,252,289 B2
(45) Date of Patent: Mar. 18, 2025

(54) AUTOMATED PACKING SYSTEMS AND METHODS

(71) Applicant: FoldedPak, Inc., Denver, CO (US)

(72) Inventors: Jeff Boothman, Powell, OH (US); Ron Maynard, Newark, OH (US); Brad Fehn, Littleton, CO (US)

(73) Assignee: Transformation Packaging LLC, Hebron, OH (US)

( * ) Notice: Subject to any disclaimer, the term of this patent is extended or adjusted under 35 U.S.C. 154(b) by 509 days.

(21) Appl. No.: 15/205,503

(22) Filed: Jul. 8, 2016

(65) Prior Publication Data

US 2017/0008654 A1    Jan. 12, 2017

Related U.S. Application Data

(60) Provisional application No. 62/190,577, filed on Jul. 9, 2015.

(51) Int. Cl.
| | | |
|---|---|---|
| *B65B 7/16* | (2006.01) | |
| *B65B 55/20* | (2006.01) | |
| *B65B 57/10* | (2006.01) | |
| *B65B 61/22* | (2006.01) | |
| *B65D 81/09* | (2006.01) | |
| *G01N 21/00* | (2006.01) | |

(52) U.S. Cl.
CPC .............. *B65B 57/10* (2013.01); *B65B 55/20* (2013.01); *G01N 21/00* (2013.01); *B65B 7/16* (2013.01)

(58) Field of Classification Search
CPC ......... B65B 55/20; B65B 61/22; B65D 81/09; G06F 2113/20

USPC .......... 53/472, 139.5, 396, 503, 504, 64, 67, 53/474, 238; 493/967
See application file for complete search history.

(56) References Cited

U.S. PATENT DOCUMENTS

| | | | |
|---|---|---|---|
| 2,828,240 A | 3/1958 | Couch et al. | |
| 3,495,374 A | 2/1970 | Ebbers | |
| 3,667,593 A * | 6/1972 | Pendleton | ......... B29C 66/83413 |
| | | | 53/472 |
| 4,217,744 A | 9/1980 | Mizutani | |
| 4,270,744 A | 6/1981 | Trogan | |
| 4,919,758 A | 4/1990 | Wagle et al. | |
| 4,922,687 A | 5/1990 | Chow | |
| 5,078,374 A | 1/1992 | Odeau | |
| 5,213,867 A | 5/1993 | Huston, Sr. et al. | |
| 5,254,389 A | 10/1993 | Tether | |
| 5,312,665 A | 5/1994 | Pratt et al. | |
| 5,339,958 A | 8/1994 | Taravella et al. | |

(Continued)

FOREIGN PATENT DOCUMENTS

| | | |
|---|---|---|
| CN | 101503019 A | 8/2009 |
| JP | 2002-87695 A | 3/2002 |

(Continued)

OTHER PUBLICATIONS

PCT International Search Report and Written Opinion in International Application PCT/US2016/041359, mailed Oct. 18, 2016, 17 pages.

*Primary Examiner* — Thanh K Truong
*Assistant Examiner* — Patrick B Fry
(74) *Attorney, Agent, or Firm* — Perkins Coie LLP

(57) ABSTRACT

The volume, content, and void volume of a box are determined. Using those determinations, a fill ratio calculation is used to establish the packing element requirement of the box.

18 Claims, 12 Drawing Sheets

(56) References Cited

U.S. PATENT DOCUMENTS

| | | | |
|---|---|---|---|
| 5,429,578 A | 7/1995 | Calbrix et al. | |
| 5,430,831 A * | 7/1995 | Snellen | G06Q 10/043 |
| | | | 700/217 |
| 5,439,730 A | 8/1995 | Kelly et al. | |
| 5,468,525 A | 11/1995 | Watts | |
| 5,468,556 A | 11/1995 | Fuss et al. | |
| 5,569,519 A | 10/1996 | Ervay et al. | |
| 5,595,811 A | 1/1997 | Stout, Jr. | |
| 5,643,647 A | 7/1997 | Wischusen, III | |
| 5,698,293 A | 12/1997 | Nordlund et al. | |
| 5,712,020 A | 1/1998 | Parker | |
| 5,829,231 A | 11/1998 | Harding | |
| 5,846,177 A | 12/1998 | Mayr | |
| 5,900,119 A | 5/1999 | Goers et al. | |
| 6,132,842 A | 10/2000 | Simmons et al. | |
| 6,217,498 B1 | 4/2001 | Simmons | |
| 6,421,985 B1 | 7/2002 | Simmons, Jr. | |
| 6,524,230 B1 | 2/2003 | Harding | |
| 6,833,055 B2 | 12/2004 | Hansen et al. | |
| 6,835,437 B2 * | 12/2004 | Goers | B65D 5/5035 |
| | | | 206/584 |
| 6,877,297 B2 * | 4/2005 | Armington | B31D 5/0047 |
| | | | 53/502 |
| 7,260,922 B2 | 8/2007 | Harding | |
| 7,337,595 B2 * | 3/2008 | Harding | B65B 55/20 |
| | | | 53/504 |
| 7,584,592 B2 * | 9/2009 | Gabrielson | B65B 55/20 |
| | | | 53/445 |
| 7,665,275 B2 | 2/2010 | Meessen | |
| 7,788,884 B2 * | 9/2010 | Cheich | B31D 5/0047 |
| | | | 493/464 |
| 7,814,733 B2 * | 10/2010 | Carlson | B65B 55/20 |
| | | | 493/25 |
| 7,814,734 B2 | 10/2010 | Bilkie, Jr. | |
| 7,849,664 B2 * | 12/2010 | Corbett | B65B 55/20 |
| | | | 53/267 |
| 7,866,125 B2 | 1/2011 | Simmons, Jr. | |
| 8,087,218 B2 | 1/2012 | Harding | |
| 8,272,195 B2 | 9/2012 | Harding | |
| 8,296,101 B1 * | 10/2012 | Barlow | G06Q 10/08 |
| | | | 53/503 |
| 8,341,092 B2 * | 12/2012 | Gabrielsen | B65B 57/14 |
| | | | 705/335 |
| 8,683,777 B2 | 4/2014 | Armington | |
| 8,997,440 B2 * | 4/2015 | Carlson | B65B 55/20 |
| | | | 53/115 |
| 9,102,429 B2 * | 8/2015 | Corradi | B65B 55/20 |
| 9,142,035 B1 | 9/2015 | Rotman et al. | |
| 9,230,233 B1 | 1/2016 | Sundaresan et al. | |
| 9,371,147 B2 * | 6/2016 | Straver | B65B 55/20 |
| 9,612,583 B1 * | 4/2017 | Qaddoura | G05B 19/128 |
| 9,686,481 B1 | 6/2017 | Graybill et al. | |
| 10,293,962 B2 * | 5/2019 | Weinmann | B65B 55/20 |
| 10,719,801 B2 | 7/2020 | Quan | |
| 10,853,757 B1 | 12/2020 | Hill et al. | |
| 2003/0121426 A1 | 7/2003 | Nanba et al. | |
| 2003/0130103 A1 | 7/2003 | Fujinuma | |
| 2004/0084826 A1 | 5/2004 | Kostiza | |
| 2004/0184017 A1 | 9/2004 | Litwin et al. | |
| 2004/0235633 A1 | 11/2004 | De Matteis | |
| 2005/0150192 A1 | 7/2005 | Armington | |
| 2005/0218222 A1 | 10/2005 | Nark et al. | |
| 2006/0014617 A1 | 1/2006 | Leupold et al. | |
| 2007/0042888 A1 | 2/2007 | Prum | |
| 2007/0283670 A1 | 12/2007 | Harding et al. | |
| 2009/0203510 A1 | 8/2009 | Kurihara et al. | |
| 2009/0277139 A1 * | 11/2009 | Eckel | B65B 55/20 |
| | | | 53/474 |
| 2010/0293898 A1 | 11/2010 | Cheich | |
| 2011/0016833 A1 | 1/2011 | Carlson | |
| 2011/0237415 A1 | 9/2011 | Kojima et al. | |
| 2011/0308204 A1 * | 12/2011 | Corradi | B65B 57/14 |
| | | | 53/472 |
| 2013/0071605 A1 | 3/2013 | Boothman | |
| 2013/0071613 A1 | 3/2013 | Boothman et al. | |
| 2013/0291998 A1 * | 11/2013 | Konnerth | B65D 81/09 |
| | | | 428/398 |
| 2014/0157729 A1 | 6/2014 | Weinmann | |
| 2015/0088767 A1 | 3/2015 | Varadarajan | |
| 2015/0210418 A1 * | 7/2015 | Cheich | B65B 51/067 |
| | | | 53/471 |
| 2016/0001518 A1 | 1/2016 | Oliver et al. | |
| 2017/0008654 A1 | 1/2017 | Boothman et al. | |
| 2017/0043953 A1 | 2/2017 | Battles et al. | |
| 2017/0091706 A1 | 3/2017 | Lloyd et al. | |
| 2017/0116571 A1 | 4/2017 | Tammattabattula | |
| 2017/0192413 A1 | 7/2017 | Langer et al. | |
| 2018/0144285 A1 | 5/2018 | Hoffman et al. | |

FOREIGN PATENT DOCUMENTS

| | | |
|---|---|---|
| WO | 2007125411 A2 | 11/2007 |
| WO | 2010119884 A1 | 10/2010 |

* cited by examiner

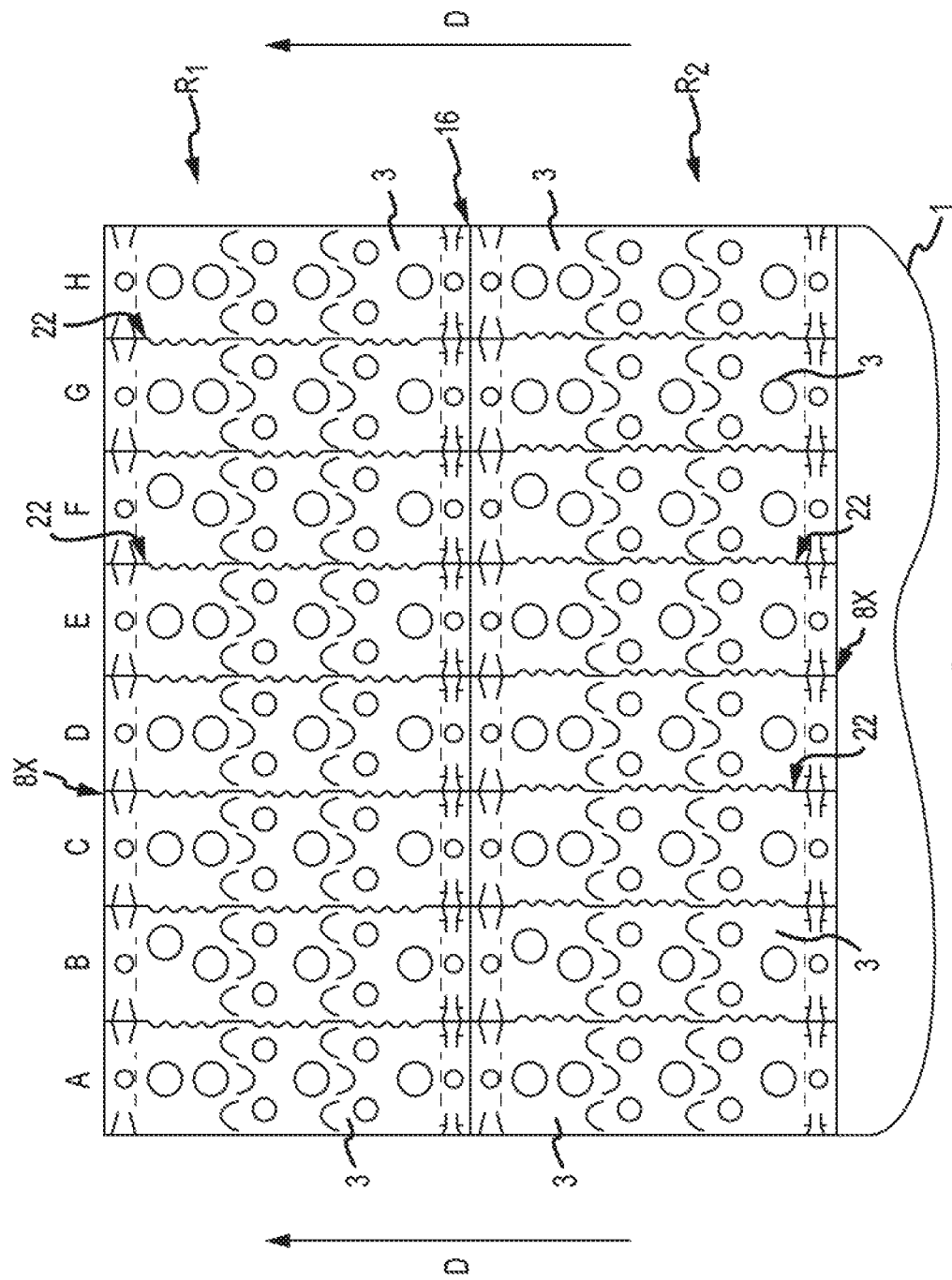

AUTOMATED PACKING SYSTEMS AND METHODS

CROSS-REFERENCE TO RELATED APPLICATIONS

This application claims priority to and the benefit of U.S. Provisional Patent Application No. 62/190,577, filed Jul. 9, 2015, entitled "AUTOMATED PACKING SYSTEM," the disclosure of which is hereby incorporated by reference herein in its entirety.

INTRODUCTION

Paper packing elements are used to protect items during shipment from any company or individual packing an item inside of a box, for example, on-line retailers or manufacturers to consumers or third-party retailers or individuals shipping packages via a parcel system. Paper packing elements are often desirable over non-paper based products such as expanded foam (commonly referred to as "foam in place"), pre-formed packing materials (commonly referred to as "packing peanuts"), or air-filled plastic bladders (referred to as "bubble wrap" or "air bags") for a number of reasons. A first reason is that paper materials are non-petroleum based products and are viewed to be more environmentally friendly. Another reason is that, prior to being used as packing materials flat-stock paper precursors used to make the packing elements may be stored flat, taking up less space in a facility. Other reasons are or would be known to a person of skill in the art. Various types of paper packing elements are disclosed in U.S. Pat. No. 6,835,437; and U.S. Patent Application Publication Nos. 2013/0071605 and 2013/0071613, the disclosures of which are hereby incorporated by reference herein in their entireties. Rapid assembly of such flat-stock paper packing material increases the efficiency of packing procedures within a shipping facility, as well as reduces waste.

SUMMARY

The automated packing systems and methods described herein can accept a fully-erected shipping box containing items ready for the addition of packing material onto one or more conveyor(s). The systems and methods will fully prepare the box for case sealing, manifesting, and shipping by determining the amount of packaging required using a series of calculations, making the required amount of material, dispensing the packing material, and settling the material so the box can be sealed. Other components and/or functionality may be utilized in the systems and methods. The systems and methods can include, without limitation, and without incorporating necessarily all of the following components and/or functionality: determine box dimensions through either direct measurement or by reading a bar code with box dimensions and transmitting that data to the system controller; use the box dimensions, conveyor controls, and a mechanical guide to position a pre-determined corner of the box at a fixed point on a conveyor belt; measure the volume of items in a footprint area of a box; use warehouse management system data to add up the total volume of items in the box; move the box to a second fixed point on the conveyor belt or to a fixed point on a second conveyor; communicate box size and volume of contents in the box footprint area to the system controller; use a set of calculations and heuristic rules to determine the correct amount of fixed volume packing material to dispense; make and dispense, with an expander machine, a correct amount of fixed volume packaging material to about 0.02 CF, in certain examples; and vibrate the box to settle the box contents and lock the packing elements in preparation for the case sealing and manifesting steps.

Additionally system may display some or all of the following advantages: full automation that does not necessarily require human intervention; use of a vision system and/or WMS (warehouse management system) data as a data input; use of a series computations and/or heuristic rules to determine the amount of material to be dispensed; use of packing material that is fixed volume; very precise determination of packing material dispensed; material dispensing accuracy to +/−0.02 CF; use of a vibration table to settle the material; and use of two or more dispensing stations (e.g., for applications that require packing material around all sides of an item being shipped).

In one aspect, the technology relates to a method includes: determining a volume of a box; determining a content of the box; determining a void volume; calculating a fill ratio; and calculating a packing element requirement. In an embodiment, the packing element requirement is based at least in part on the void volume and the fill ratio. In another embodiment, the packing element requirement has an angle of rotation of a rotary packing element expander. In yet another embodiment, the packing element requirement has a number of linear oscillations of a reciprocating packing element expander. In still another embodiment, the packing element requirement has a number of fixed-volume packing elements.

In another embodiment of the above aspect, the content of the box includes at least one of a number of elements within the box and a volume of elements within the box. In an embodiment, the void volume is based at least in part on the volume of the box and the volume of elements within the box. In another embodiment, the method further includes calculating an average fill aspect ratio based at least in part on the volume of the box and the number of elements within the box. In yet another embodiment, the method further includes calculating at least one of a pre-contents requirement and a post-vibration requirement of the box.

In another aspect, the technology relates to a method including: receiving a box information signal; receiving a content information signal; calculating a packing element requirement based at least in part on the box information signal and the content information signal; receiving a box pre-fill position signal when a box is in a pre-fill position, wherein the pre-fill position is distinct from a fill position; and sending a start machine signal based at least in part on the box pre-fill position signal. In an embodiment, the method further includes sending an agitate signal. In another embodiment, the start machine signal is configured to initiate rotation of a rotary packing element expander. In yet another embodiment, the method further includes sending a seal box signal. In still another embodiment, the calculating operation includes calculating a fill ratio.

In another embodiment of the above aspect, the method further includes sending an end machine signal based at least in part on the fill ratio. In an embodiment, the content information signal is associated with at least one of a number of elements within the box and a volume of elements within the box. In another embodiment, the method further includes calculating a void volume based at least in part on the box information signal and the volume of elements within the box. In yet another embodiment, the method further includes calculating an average fill aspect ratio based at least in part on the box information signal and the number of elements within the box.

In another aspect, the technology relates to a system having: at least one processor; and memory encoding computer executable instructions that, when executed by the at least one processor, perform a method including: determining a volume of a box; determining a content of the box; determining a void volume; calculating a fill ratio; and calculating a dispensing requirement for packing elements, wherein the dispensing requirement is based at least in part on the void volume and the fill ratio. In an embodiment, the content of the box includes at least one of a number of elements within the box and a volume of elements within the box. In another embodiment, the void volume is based at least in part on the volume of the box and the volume of elements within the box. In yet another embodiment, the method further includes calculating an average fill aspect ratio based at least in part on the volume of the box and the number of elements within the box.

BRIEF DESCRIPTION OF THE DRAWINGS

There are shown in the drawings, embodiments which are presently preferred, it being understood, however, that the technology is not limited to the precise arrangements and instrumentalities shown.

FIG. 1A depicts a sheet of flat stock paper precursor material.

DETAILED DESCRIPTION

Figure 1B:
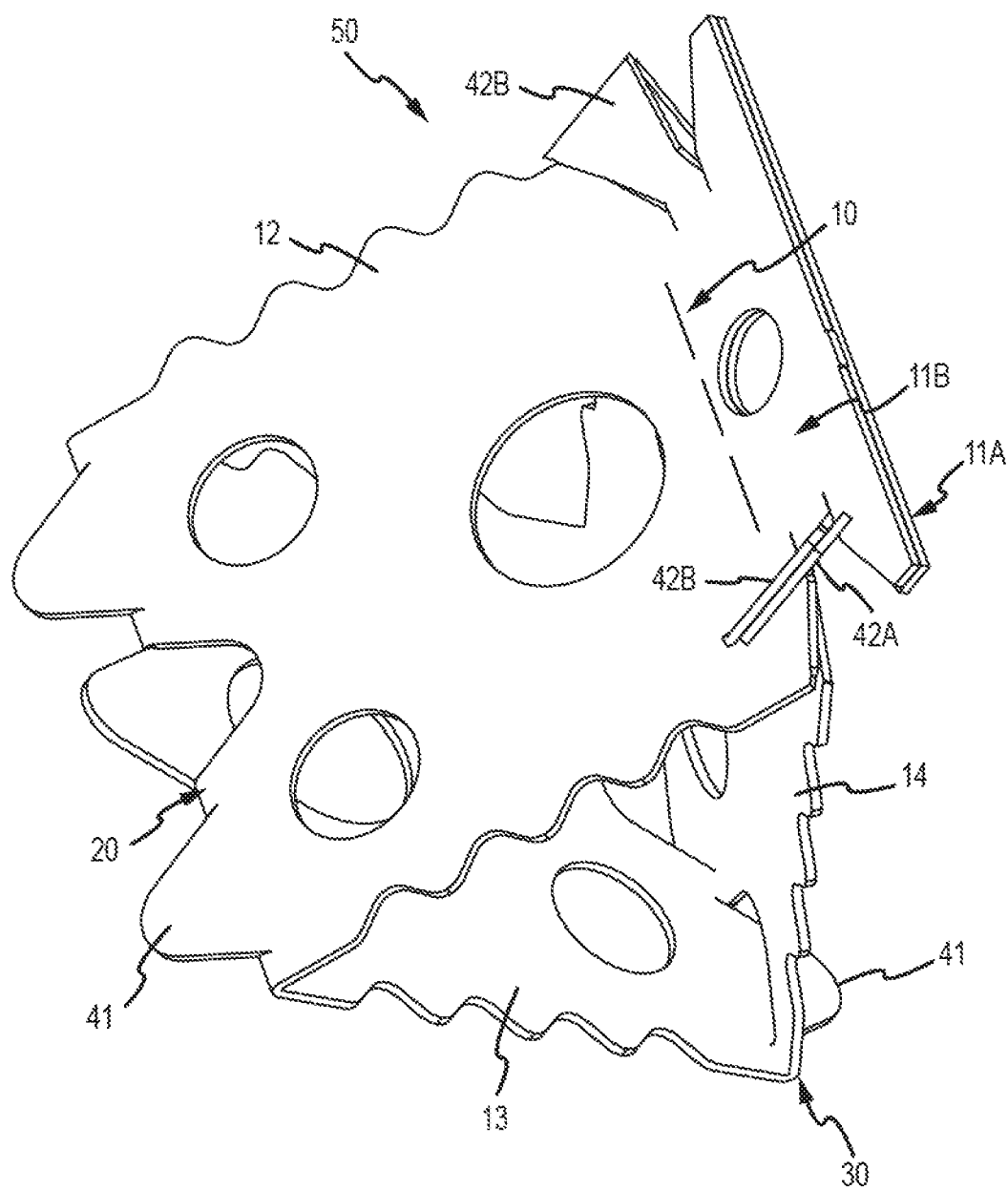
FIG. 1B depicts an expanded packing element made from the flat stock paper precursor material of FIG. 1A.

FIG. 1A depicts a flat-stock paper precursor material sheet 1 that can be utilized in the systems and methods described herein so as to be expanded into packing elements. As illustrated in FIG. 1A, the sheet 1 includes eight columns A-H of individual precursor chip 3. Only two rows $R_1$, $R_2$ are depicted, but on a continuous sheet 1, any number of rows may be present. Similarly, the total number of columns may be greater or fewer than eight. One commercial embodiment includes up to 15 columns, although sheets having a greater number of columns also are contemplated. Regardless of the number of rows or columns, it is desirable that the precursor chip 3 formed on the sheet 1 remain attached to one another as they are loaded on the machine, until separated at certain stages of processing. This delay of the separation process allows for R2 to be pulled into the machine via R1 prior to the separation of R1 and R2.

The sheet 1 includes a perforation line 8X between adjacent precursor chip 3 to enable them to be completely separated from one another during processing. The separation between adjacent chips 3 in a single row is accomplished, for example, by bursting or cutting connecting tabs 22 at the chip interfaces. As illustrated in FIG. 1A, lines 8X are zigzag in configuration, so that the edges formed on the separated and expanded packing elements will be jagged or serrated, thereby providing appropriate irregular surfaces for interlocking with other fully expanded packing elements when used as packaging. The lines 8X could be formed in other configurations that would accomplish the same result. The sheet 1 includes a line of weakness 16 between the precursor chip 3 in adjacent rows $R_1$, $R_2$. A precursor chip 3 in one row $R_1$ may be separated from an adjacent precursor chip in the same row $R_1$ by bursting the line of weakness 16. Other features (e.g., holes, apertures, etc.) are described in the above-referenced patents and publications. Each precursor chip 3 also includes tabs 11A, 11B to form connecting features to mechanically hold a fully-expanded packing element in shape. These connecting features may include: dovetail slots and grooves, tongue and groove cuts, hook cuts, and combinations thereof. These features are folded together to secure the sections of the precursor chip and thereby maintain the packing elements in their expanded form.

In the description below, sheets 1 are fed onto a drum as that drum rotates. As used herein, the sheets are fed in a direction D onto the machine. As such, row $R_1$ is first loaded onto the machine and, as the drum advances, row $R_2$ is next pulled onto the machine by R1 prior to R1 being mechanically separated from R2. In a continuous sheet 1, a third row (and subsequent rows) is loaded and processed (e.g., "folded" or "expanded"). In this example, row $R_1$ is referred to as the leading row, while row $R_2$ is referred to as the following row. Similarly, row $R_2$ would be a leading row while a third row would be referred to as a following row. Such nomenclature is used herein for clarity.

An expanded, finished packing element 50 is depicted in FIG. 1B. Dovetails 42A, 42B secure the packing element 50 into a folded configuration. Forming the individual packing elements 50 can be accomplished in various ways. The machines described herein fold the precursor chips of each row of the sheet along lines 10, 20, and 30 to form the tabs 11A and 11B, as well as sides 12, 13 and 14, into a triangular shape. The folding of lines 20 and 30 forms spines or projections 41 which are also useful for engagement and interlocking of the packing elements 50 when used in packaging.

Figure 2A:
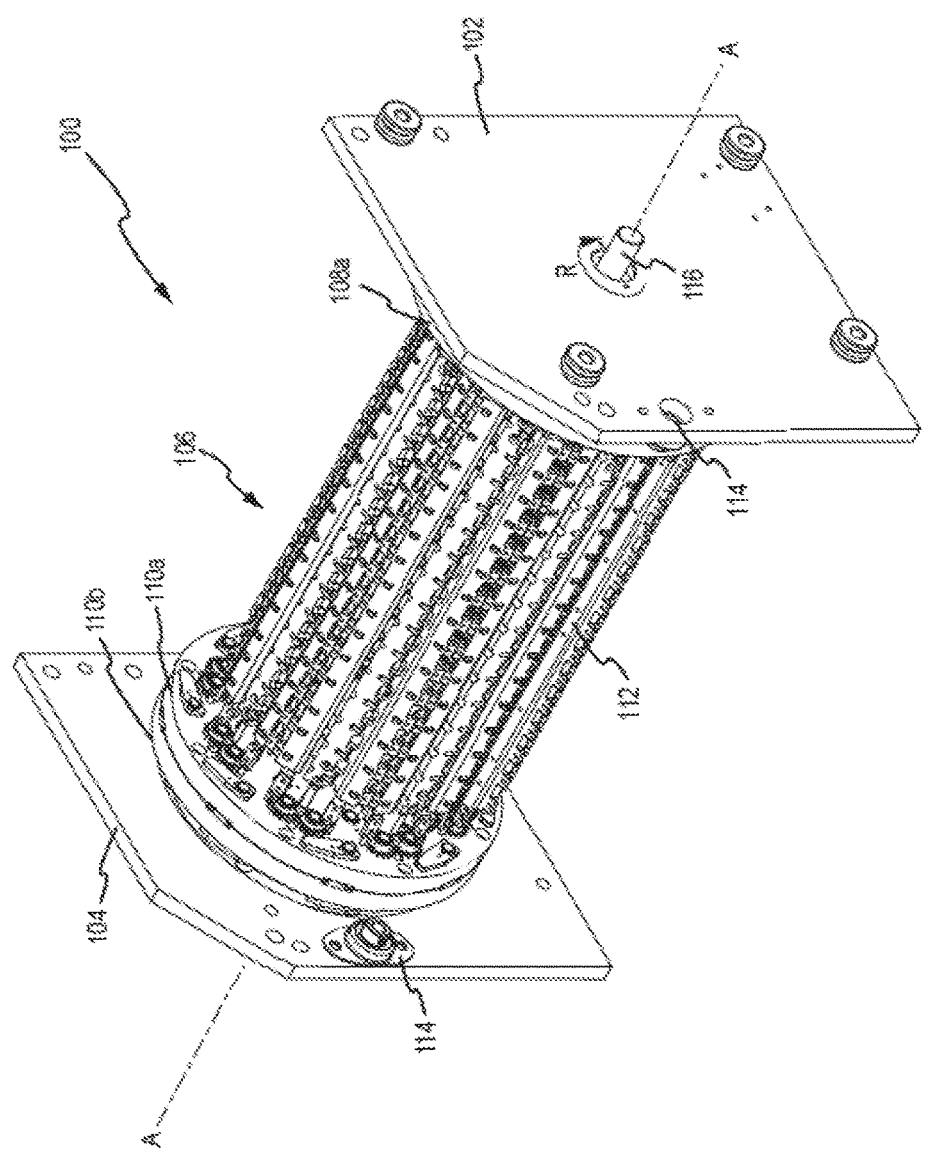
FIG. 2A depicts a front perspective view of a packing material expansion machine.

FIG. 2A depicts a perspective view of a rotary-type stock material expansion machine 100. The machine, and other machines falling within the scope of the contemplated technology, can be utilized to fold-flat stock paper precursor materials, such as those described in U.S. Pat. No. 6,835, 437; and U.S. Patent Application Publication Nos. 2013/0071605 and 2013/0071613, the disclosures of which are hereby incorporated by reference herein in their entireties. Since the flat-stock paper precursor materials are formed from a substantially two-dimensional flat sheet to a three-dimensional triangular packing element, the folding of the flat stock paper is referred to herein as "expanding." The thickness of the flat stock paper does not expand. More accurately, the total volume of a folded packaging element is greater than the total volume of an unfolded precursor chip.

The machine 100 includes two cam plates or base plates 102, 104 with a drum 106 disposed therebetween along an axis A. The drum 106 includes paired end plates 108, 110 at both a first end of the drum 100 and a second end of the drum 100. The end plate 108 includes an inner plate 108a and an outer plate 108b. The opposite end plate 110 includes an inner plate 110a and an outer plate 110b. The pairs of end plates 108a, 108b and 110a, 110b are closely joined together to keep residual paper material, dust, and dirt out of this portion of the drum 106. In certain examples, the plates 108a, 108b, 110a, 110b can be manufactured of a bearing material such as plastic. DELRYN™ may be used in certain examples. Additionally, between each pair of end plates 108a, 108b and 110a, 110b are supported a set of drive or master gears and a set of symmetrically driven or slave gears. These gears are depicted herein. The space between each pair of end plates 108a, 108b and 110a, 110b is set such as to allow the free and uninhibited rotation of the aforementioned gear sets. The space between the end plates 108a, 108b and 110a, 110b can be lubricated to further reduce friction at the gears. The symmetrically driven or slave gears are aligned with a number of jaws 112 that are positioned between the end plates 108, 110.

In the depicted embodiment, the drum 106 supports eight sets of jaws 112, but other numbers are contemplated, for example, four, six, ten or more sets may be utilized. In general, it is desirable that an even number of jaws are utilized, such that the forces associated therewith are balanced around the axis A of the drum 106. A larger number of jaw sets 112 may be desirable, as it makes the drum 106 more round, which helps ease loading of the flat sheet stock into the drum 106. Each jaw set 112 includes a plurality of individual jaws having a fixed base and a pair of pivotable pinchers. Each jaw of the particular jaw set 112 is configured to move in unison with the other jaws in that jaw set 112. As such, in the descriptions below, the operation of a single jaw is depicted and described. It will be apparent to a person of skill in the art, however, that all jaws in a particular jaw set operate in an identical manner described for just a single jaw. The operation of each jaw set 112 is depicted in more detail below. The pivotable pinchers include a pivotable first clamp and a pivotable second clamp disposed opposite the base from the first clamp. Each jaw set 112 closes and opens (thereby changing a separation angle between the pivotable clamps) during a rotation of the drum 112 about the axis A. This change in separation angle folds the flat sheet stock material into a plurality of expanded packing elements. The configuration of the jaws allow a central portion of the precursor chip to be held proximate the base portion while the pivotable pinchers fold the two outer portions of the precursor chip, so as to form a finished packing element. Other operations used to load, separate, bend, fold, crimp, and clear flat sheet stock into folded or expanded packing elements are performed as the drum 106 rotates about the axis A. It should be noted that all of the jaw sets 112 are not opened and closed at the same time, but are actuated at certain positions about the drum. These positions are defined, at least in part, by the captive cam groove and the positions of the followers located therein. A first or leading jaw set is oriented substantially flat (as depicted in FIG. 2A) to capture flat sheet stock on the machine 100. As that first jaw set begins rotation about the drum 106 axis A, the first and second pivotable clamps gradually pivot to a closed position about their separate and respective axes, thereby folding the flat stock material into a three-dimensional packing element. In the depicted example, the pivoting of the pivotable clamps is symmetrical. As a leading row of precursor chips is processed, that leading row is separated from a following row. Once folded, precursor chips in the same row are separated from each other, so as to form discrete packing elements. Thereafter, the flushed packing elements are removed from the first jaw as the first jaw returns to a substantially flat position. As a leading jaw set 112 advances around the drum 106, a following jaw set 112 follows, performing the same process, so as to constantly produce the three-dimensional packing elements.

The machine 100 can also include bearings 114 that are used to support a rotating brush (not shown for clarity). The rotating brush includes one or more lengths of bristles and spins as the drum 106 rotates R. In the depicted example, the rotating brush spins in an opposite direction of rotation of the drum, and the bristles come close to the drum 106. In certain examples, the brush may lightly contact the drum. The rotating brush aids in the release of any expanded packing elements that have not already dropped from the drum 106, so as to minimize and/or eliminate the possibility of interrupting the load station as the jaw set begins its second revolution about the drum 106 axis A.

The drum 106 can be driven by a motor or hand-crank (not shown) that can be connected at either end of axle 116. The rotary brush can also be motor- or hand-driven, and in certain examples can be driven by the same mechanism as the drum 106. The drum motor can be direct-drive, belt-drive, chain-drive, and so on, so as to rotate the drum 106. DC motors can be utilized. The drive system can include a friction clutch for overload protection. A number of sensors in the system can detect rates of rotation, jams, misalignments, or any other system conditions that will enable an attached controller to determine operational status of the system. In alternative embodiments, stepper motors and stepper controls can be utilized. Certain configurations of a variable speed drive motor along with certain sensors will enable the machine to produce a pre-determined number of chips. Pulleys, gears, sprockets, and other components can be utilized to achieve a desired gear ratio and/or incorporate rotation of the brush. In certain examples, the motor can be a gear reduction motor optimized in speed and power to achieve the desired output rate. Rates of rotation for the drum 106 can be about 60 RPM, while the brush may rotate about 1750 RPM. These rates are for a maximum output in the tested configuration, even though the machine can be operated at lower rates to achieve a lesser output. The machine 100 can produce expanded paper packing elements at a rate of about 10 cubic feet/minute, with each expanded packing element measuring about 2.3 cubic inches in volume. As such, in examples where each drum 106 contains 8 jaw sets 112 and each sheet contains 15 elements per row, such a jaw set can produce about 0.16 cubic feet of packing elements with each rotation of the drum. At certain speeds, the machine 100 may produce up to 10 cubic feet of packing elements. Other performance characteristics are contemplated, depending on, e.g., the number of jaws per jaw set, the number of jaw sets per drum, the rate of drum rotation, and so on.

The machine 100 is shown bounded only by the two cam plates or base plates 102, 104. These are merely depicted as supports for the rotating drum 106. In actuality, the entire machine 100 would likely be disposed within a housing having one or more access panels, conduits for control wiring, mounting brackets for motors, etc. By surrounding the machine 100 in a housing, persons working around the machine 100 can be protected from inadvertent contact, the sound output of the machine can be reduced, and so on.

Figure 2B:
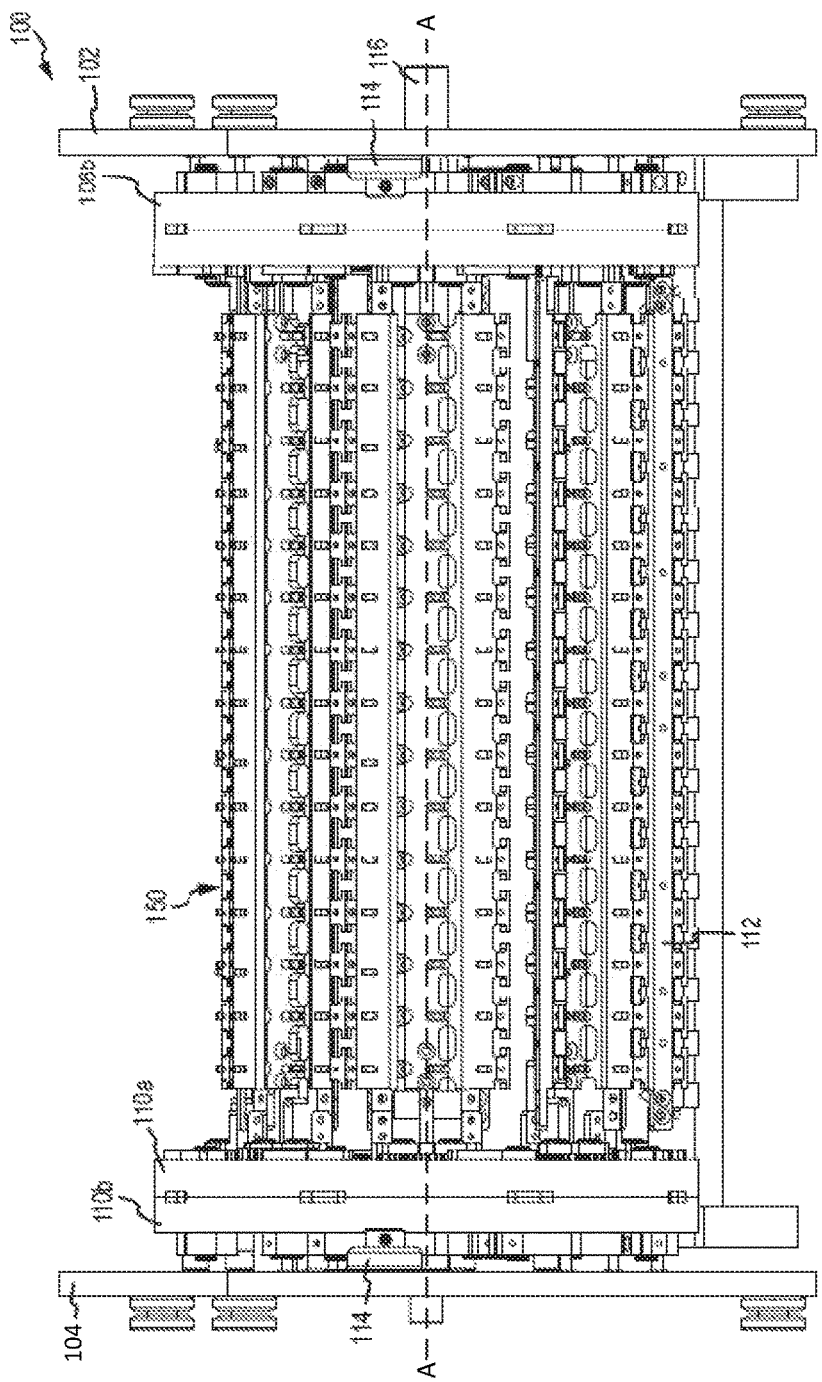
FIG. 2B is a front view of the packing material expansion machine of FIG. 1.

FIG. 2B is a front view of the packing material expansion machine 100 of FIG. 2A. A number of the elements are depicted and described above in FIG. 2A and as such are not necessarily described further. The drum 106 includes a load area 150 disposed proximate an upper side of the drum 106. The load area 150 is characterized by a position of the jaw set 112 that is substantially flat and upward-facing, so as to receive a continuous sheet of flat stock material. A stage (not shown) substantially tangential to the load area 150 can be used to guide the flat stock material onto the load area 150. In FIG. 2B, the stage would be substantially orthogonal to the page. The various positions of the jaw sets 112 about the drum 106, as well as other construction and operational details, are described in U.S. Patent Application Publication No. 2016/0001518, the disclosure of which is hereby incorporated by reference herein in its entirety.

Figure 3:
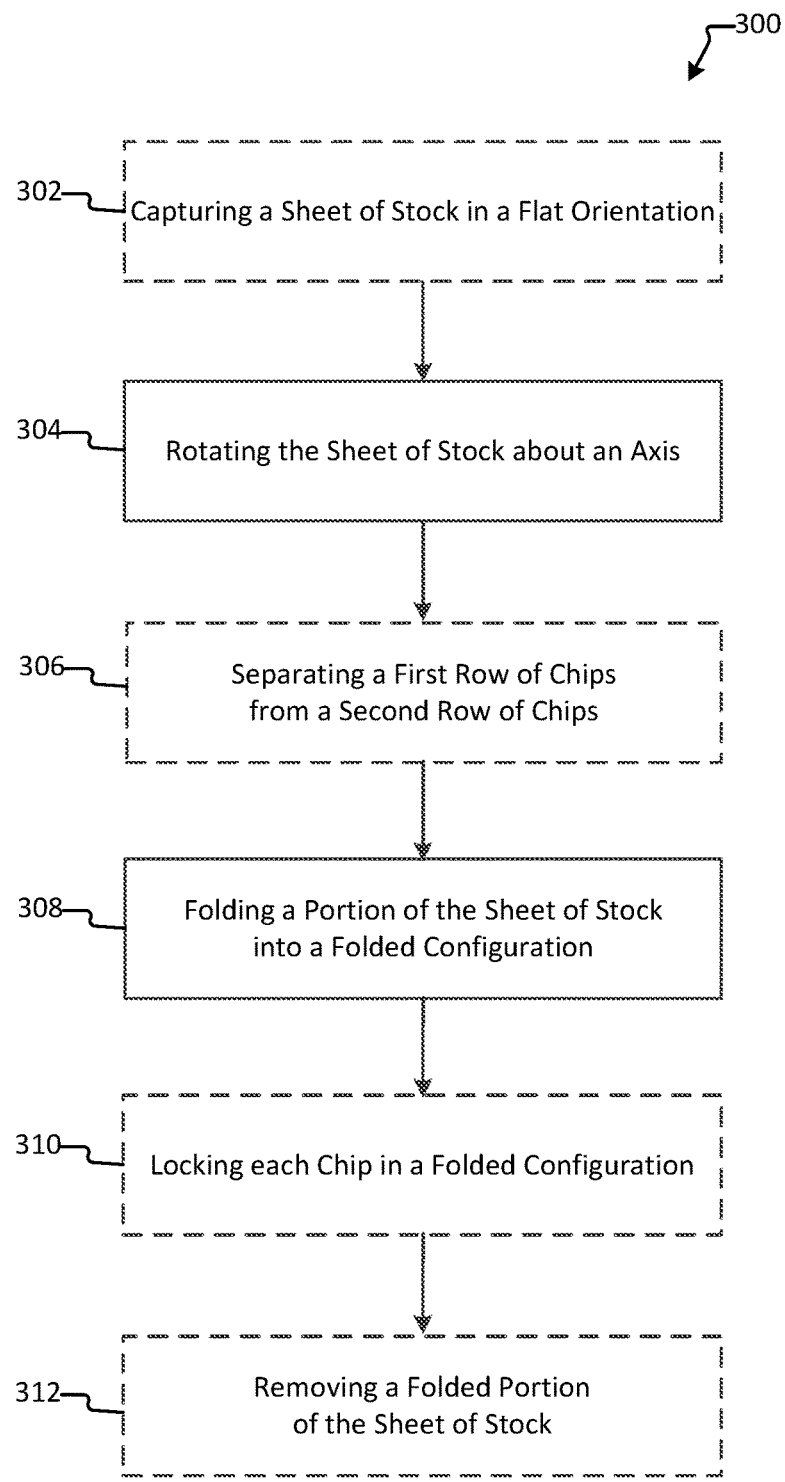
FIG. 3 depicts a method of expanding flat stock material into expanded packing material.

FIG. 3 depicts a method 300 of expanding flat stock material into packing elements, e.g., by utilizing the rotating packing material expansion machine 100 of FIGS. 2A and 2B. In the broadest sense, the method 300 contemplates rotating a sheet of stock about an axis, operation 304, while simultaneously folding the sheet of stock from a substantially flat configuration to a substantially folded configuration, operation 308. Additional steps of the method 300 are depicted. As described elsewhere herein, the various operations of the method 300 occur while a drum onto which the flat stock material is loaded rotates about an axis. This rotation allows for fast, efficient folding of packing elements on-demand. The method begins in operation 302 by capturing a sheet of stock material in a substantially flat configuration. The stock is captured after being loaded onto a rotary machine. The term "capture" in this context contemplates being held by one or more jaws such that the stock material can be advanced via rotation about the drum, as indicated in operation 304. Thereafter, in operation 306, a first or leading row of precursor chips is separated from a second or following row of precursor chips. Once separated, operation 308 folds the separated portion of the sheet of stock into a folded configuration. In operation 310, each folded precursor chip is locked into a folded configuration. This locking forms the finished packing element. Thereafter, in operation 312, the folded packing elements are removed from the machine.

The rotary packing element expansion machine described above can be utilized in automated packing systems to pack boxes for shipping. The rotary machine enables fast, efficient, and accurate dispensing of packing elements. For example, a specific angular rotation of the rotary packing element expansion machine will dispense a known number of packing elements. However, reciprocating packing element expansion machines may also be utilized, where a single linear oscillation of the reciprocating machine dispenses a known number of packing elements. Both rotary and reciprocating machines are available from FoldedPak, Inc., of Denver, Colorado Other machines may be utilized. The systems and methods described below further improve accuracy of the dispensed packing elements, improve (reduce) cycle time of boxes within the automated packing system, and display other advantages. In fact, in certain packing systems, the accuracy and speed may be such that the need for any human operator intervention is obviated. These advantages are present even in systems that pack boxes of varying sizes, with varying contents.

Figure 4:
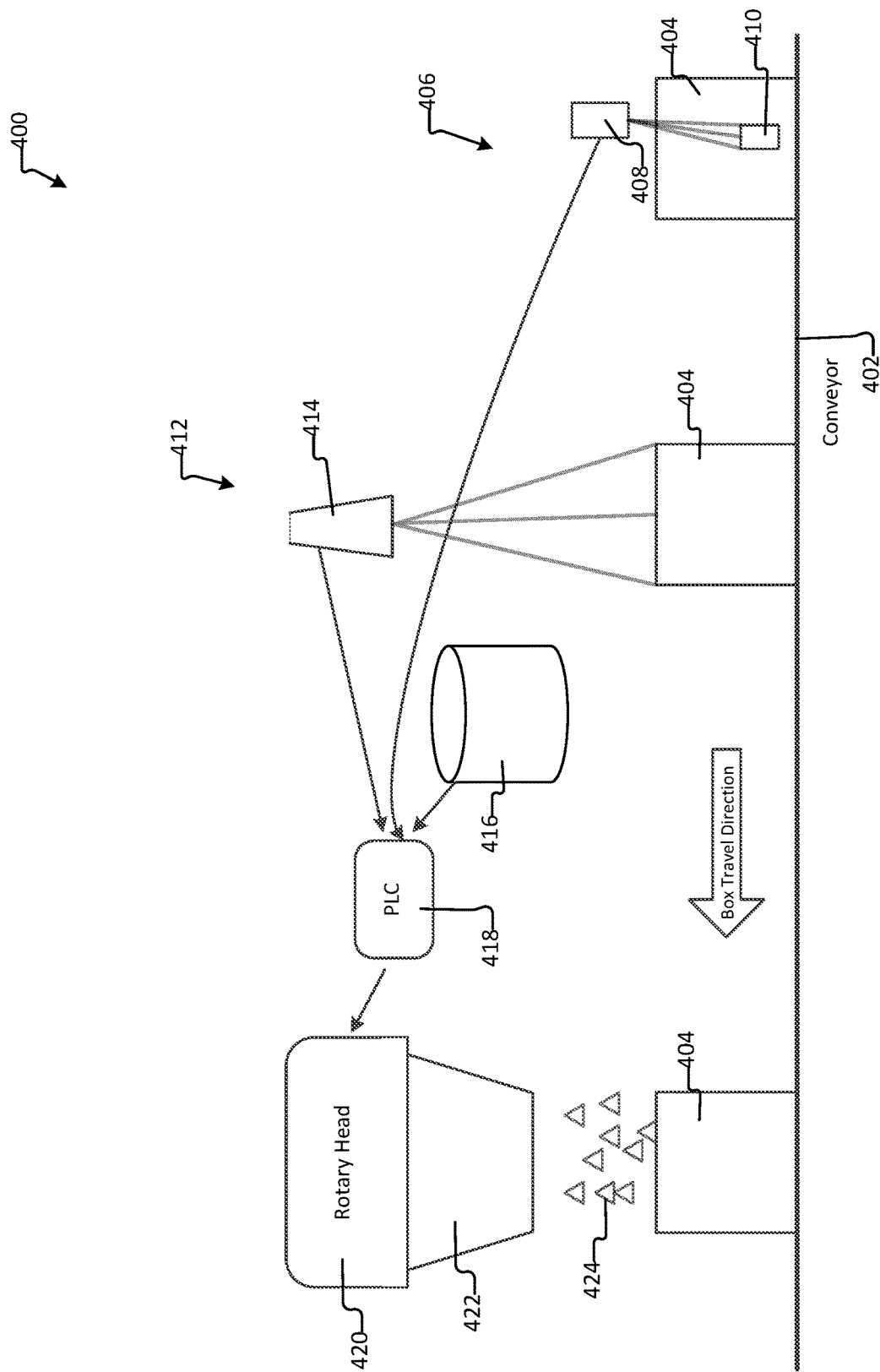
FIG. 4 depicts a schematic diagram of one example of an automated packing system.
Figure 5:
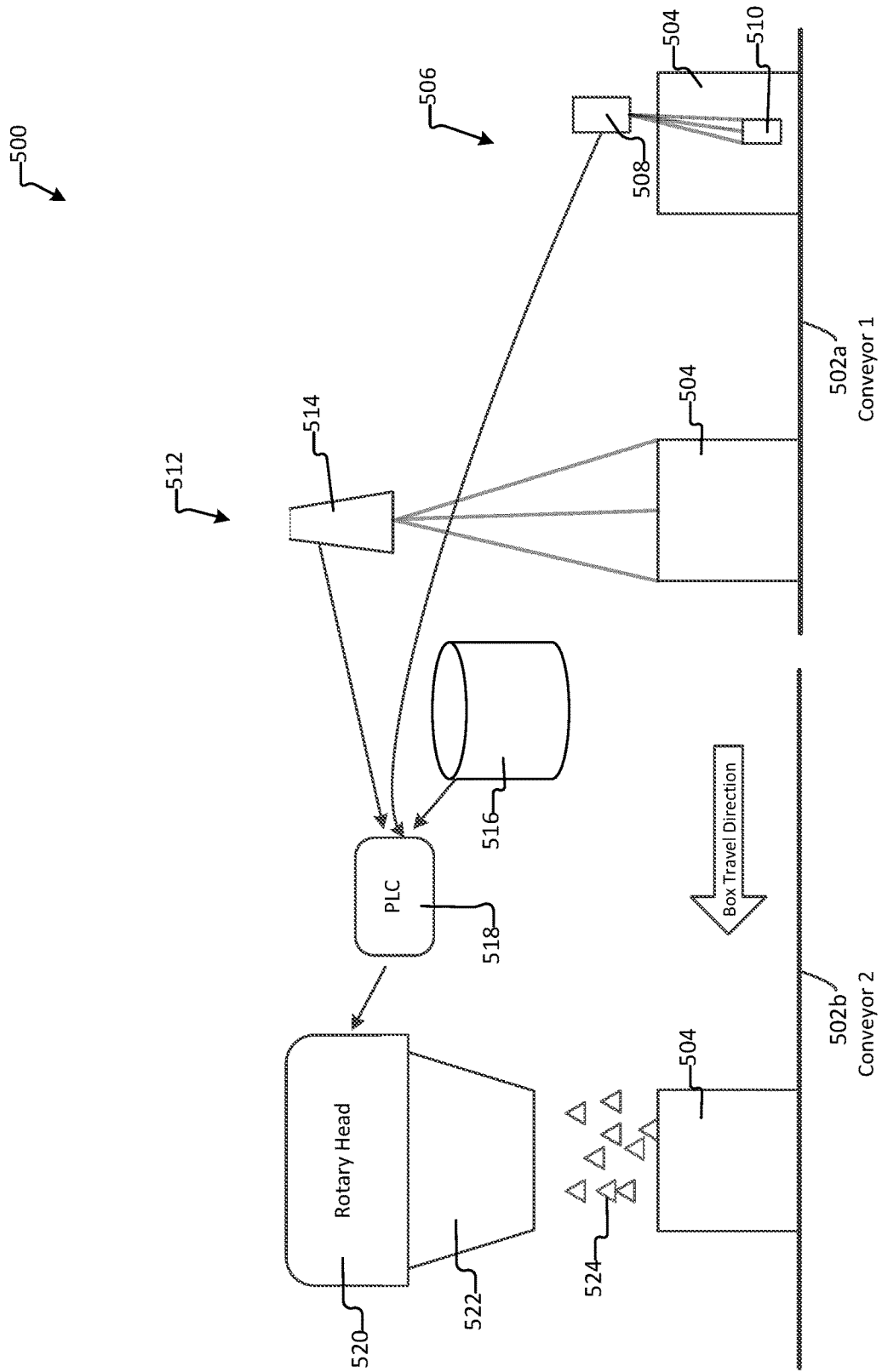
FIG. 5 depicts a schematic diagram of another example of an automated packing system.

FIGS. 4 and 5 each depict examples of automated packing systems 400, 500 and are described concurrently. The systems 400, 500 include one or more conveyors 402, 502 on which assembled boxes 404, 504 are guided to various stations of the system 400, 500. FIGS. 4 and 5 depict various locations of a single box 404, 504 as it travels along the conveyors 402, 502. One difference between the systems 400 and 500 is the utilization of two conveyors 502a, 502b in FIG. 5. Any number of conveyors may be utilized in various examples. A box information station 406, 506 may include a barcode scanner 408, 508 that reads a barcode 410, 510 disposed on the shipping box 404, 504. The barcode 410, 510 can include information such as: box volume, box dimensions, shipping information, box information, contents information (e.g., description of contents, volume of contents, etc.), special instructions, and so on. A contents information station 412, 512 can include a scanner 414, 514 such as a vision scanner, optical scanner, laser scanner, and so on, that may determine a volume of items contained within the box, a description of the contents, and so on. In examples, contents information may be determined in as little as three seconds or less. Additionally, the system can measure the amount of volume occupied within a given area where the standard deviation of each measurement is less than about 8% of the mean measurement. Deviations of between about 2% to about 8%, and between about 4% and about 6%, are also contemplated. In certain examples, the box information station 406, 506 may be integrated into a single station along with the contents information station 412, 512. For example, all of the information obtained in stations 406, 506 and 412, 512 may be obtained from a barcode scanner in a single station.

In another example, a warehouse management system (WMS) 416, 516 can be utilized to obtain the information obtained by the box information station 404, 504 and/or the contents information station 412, 512. Thus, in examples, a single input related to the box 404, 504 can provide the system 400, 500 with the information required to determine the size of the box 404, 504, and the contents thereof, so as to determine an amount of void space within the box 404, 504. This information can be based on or derived from shipping and distribution information stored within the WMS. Regardless of the component or method utilized, this information may be sent to a system controller, which may be a programmable logic controller (PLC) 418, 518 that determines the amount of packing material required to accurately and effectively pack the box 404, 504.

The PLC 418, 518 performs one or more calculations as described in more detail below. Upon performing the calculations, the PLC 418, 518 sends an instruction signal, e.g., in the form of a machine start signal, to a packing element expansion machine 420, 520. In examples, the packing element expansion machine 420, 520 may be the rotary-type expander depicted in FIGS. 2A and 2B. The expander folds the flat precursor sheets depicted in FIG. 1A into the fixed volume packing elements depicted in FIG. 1B. The machine 420, 520 discharges the packing elements 424, 524 into a delivery structure 422, 522 so as to dispense a known quantity of packing elements 424, 524 with each rotation or partial rotation of the drum of the machine 420, 520. As such, for a known volume of packing elements 424, 524 required to accurately pack the box 404, 504, the expansion machine 420, 520 can rotate a desired amount to as to produce on site the required amount of packing elements 424, 524. This results in little, if any, waste, and reduces or eliminates overpacking or underpacking. Thereafter, the box 404, 504 may be guided to a vibration table (not shown) that helps settle the packing elements 424, 524 in the box 404, 504. The box 404, 504 may then be closed at a sealing station (not shown) and labeled with shipping information (such shipping information may also be included on the barcode 410, 510). Packing systems such as those described in FIGS. 4 and 5 can display any or all of the advantages, structures, and/or functionality described herein.

Figure 6:
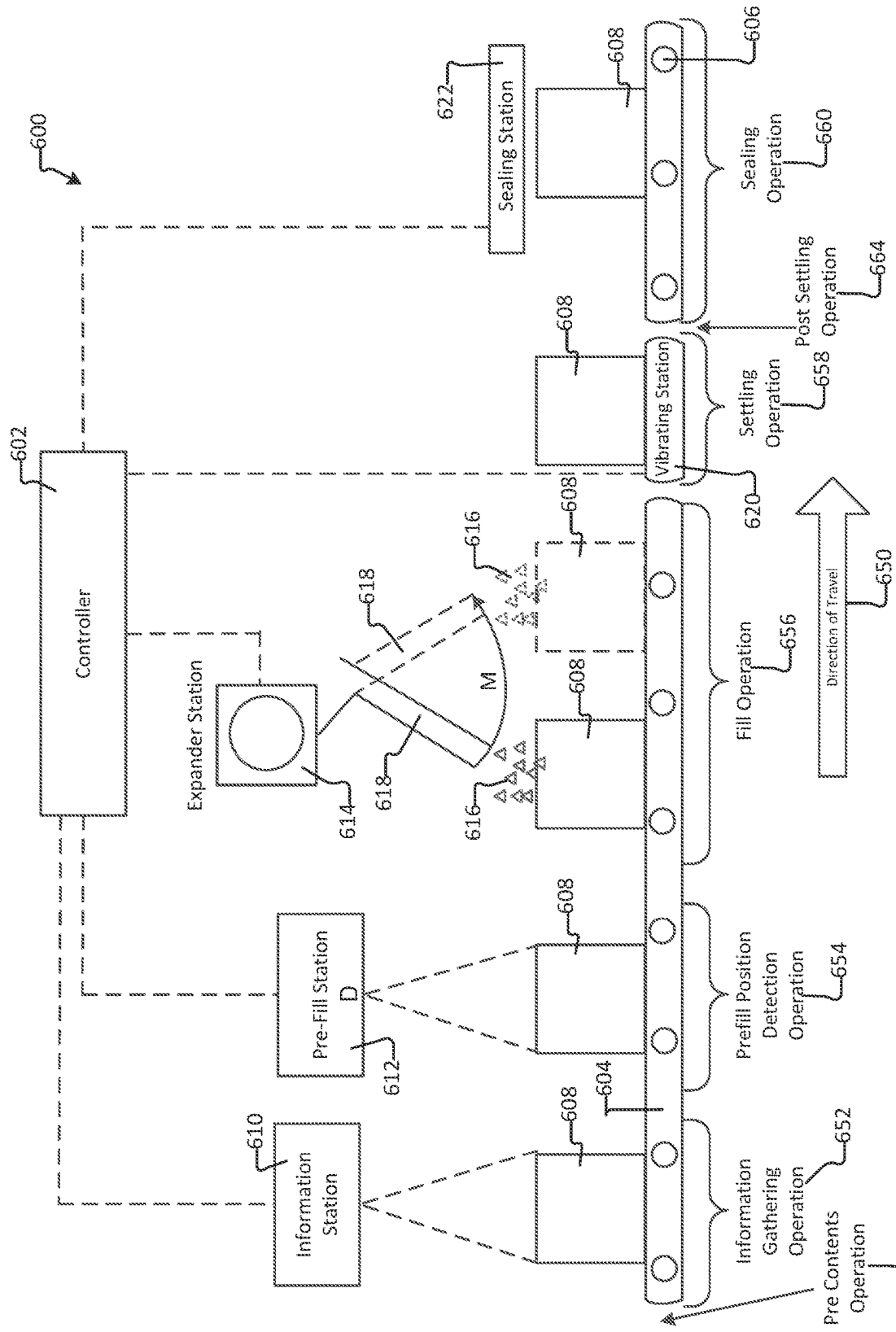
FIG. 6 depicts a schematic diagram of another example of an automated packing system.

Another example of a packing system 600 is depicted in FIG. 6. The packing system 600 of FIG. 6 includes certain components, stations, and elements depicted above in FIGS. 4 and 5, but also includes additional structure and functionality as further detailed below. In general, the system 600 includes elements, structures, and components that enable certain operations. As such, along a direction of travel 650 of the conveyance system, the system 600 includes an information gathering operation 652 where information is obtained regarding the box dimensions, e.g., interior volume, contents thereof, contents volume, etc. A position of the box 608 is detected at a prefill position detection operation 654, prior to reaching the fill operation 656. By detecting the box 608 before reaching the fill operation 656, dwell time in the fill operation 656 is reduced, thus improving line speed, as described in more detail below. Thereafter, a settling or agitation operation 658 settles the packing elements into the box 608, prior to entering a sealing operation 660, after which the box 608 exits the system 600. Additionally, each of the systems depicted above in FIGS. 4-6, or other systems similar thereto, may also include optional pre-contents and post-settling (or post-vibration) operations. A pre-contents operation 662, for example, includes dispensing an amount of packing elements to cover a bottom of a shipping box, so as to provide cushioning at that portion of the box, prior to the introduction of any items to the box. A post-settling operation 664 is disposed after the vibration station, so as to complete fill of the box with packing elements (since the packing elements may have settled during the agitation operation). The amount of packing elements distributed during these operations may be based on additional fixed or calculated rules.

A controller 602, which may be a programmable logic controller (PLC), warehouse management system (WMS), or other device, is utilized to collect and process the available data and signals sent between the various stations. Additionally, although not depicted, the controller 602 may also control the motors, solenoids, etc. that form part of the conveyance system. In this case, the conveyance system includes multiple conveyor belts 604, 606. Other machinery, e.g., lifting or lowering arms, directional guides, and so on, as typically used in conveyance systems, may be utilized as required or desired for a particular application. Additionally, different configurations of conveyor belts may also be utilized to move a box 608 through the conveyance system 600 that can position a corner of a box within about 1 cm in the direction of conveyor travel may be desirable. Alternatively or additionally, a pneumatic pushing assembly and guide may position a box corner to within 1 cm in a direction perpendicular to the direction of conveyor travel. Proper positioning of boxes may be enhanced by using scanner that measures volume within a defined area in an XY plane, given that one box corner is at a defined location in an XY plane located on the conveyor.

A box 608 first enters the system 600 at an information acquisition station 610. This may include a barcode, vision, optical, laser, or other scanner that may be used to acquire information about the box 608, contents thereof, box shipping information, WMS information, and so on. As such, the box 608 may be identified and tracked as it passes through the various stations of the system 600 Thereafter, the box 608 enters the prefill station 612, which may include a scanner, detector D, or physical switch that may detect the position of the box 608 prior to reaching the fill operation 656. Depending on the configuration and/or location of the subsequent packing element expander 614, there may be a delay between the time the box 608 enters the fill operation 656 and the time packing elements enter the box 608 (as they typically fall by gravity). As such, the system 600 contemplates the use of a signal received when the box 608 reaches the prefill station 612 to begin operation of the packing element expander 614, prior to the box 608 actually being positioned for receipt of packing elements 616. Doing so reduces the dwell time of the box 608 at the fill operation 656 and total life cycle time of the box 608 through the entire system 600.

In certain examples, the box 608 may briefly pause during the fill operation 656 as needed to receive the calculated amount of packing elements 616. In the depicted example, however, the packing element expander 614 releases packing elements 616 into a discharge structure 618 that is configured to move M so as to follow movement of the box 608. As such, the box 608 need not stop during the fill operation 656, thereby reducing life cycle time within the system 600. This can amount to a significant overall time savings. The discharge structure 618 may use an angled chute with a circular outlet with a size that is at least four times the longest dimension of any side of the packing chip to reduce bridging in the outlet area caused by the interlocking nature of the packing chips. The angle of the chute from vertical is less than or equal to the angle of repose of the interlocking packing chips, in certain examples. Cloth or rubber fingers may extend past the outlet of the chute down towards the conveyor that allows flow to be directed into the box 608 after exiting the outlet. The cloth or rubber fingers may deflect and may assume a generally vertical orientation as box 608 edges pass underneath them while travelling on the conveyor belt 604.

A vibration system 620 may be utilized to settle the packing elements within the box 608. As the packing elements settle, the features thereof interlock as described above to provide robust cushioning to the contents of the box 608. Last, the box 608 passes through a sealing station 622 that may utilize tapes, liquid adhesives, and/or mechanical fasteners, as required, to seal the box 608.

The packing systems described herein operate with significant precision. This can be for a variety of reasons and due to a variety of integrated functionality and features. For example, the packing systems are intended to be used with fixed volume paper packing materials, such as those described above, although other types of packing materials may benefit from the technologies and methods described herein. The systems utilize scanners that determine precise volumetric measurements of both the shipping box and the items disposed therein. Additionally, the systems utilize unique rules and perform on demand calculations so as to determine the precise amount of packing elements required to properly pack each box. Many prior art systems also utilize precise measurements to determine a required amount of packing elements for a particular box. However, existing solutions have thus far failed to recognize that simply determining a difference between box volume and content volume does not result in sufficiently accurate measurements. As such, prior solutions require operations subsequent to filling to ensure a shipping box is properly filled. For example, some existing solutions continuously overfill and, as such, require packing elements to be swept, blown off, or otherwise removed from the box prior to box sealing. This results in a waste of packing elements and potentially unsafe conditions within a packing area of a shipping facility. To avoid such conditions, some solutions utilize deliberate automatic underfilling of a shipping box, followed by manual filling by a human operator, which increases costs. Still other solutions utilize compressible packing elements such as kraft paper, but these have to be inserted via a human operator.

In conjunction with the systems described herein, it has also been determined that relative differences in box sizes, as well as relative differences in the contents therein, can have a considerable effect on the accurate measuring and determination of the volume of packing elements to be dispensed. In a general example, and in order to account for the fixed volume aspect of the packing elements, the size of the box containing the items and the volume of the box that is filled with items is used to determine the optimal amount of fixed volume packing elements to dispense, without overfilling the box. By not overfilling the box, the box may be sealed automatically, in some cases without any human intervention or additional operations to remove excess packing material or add additional packing material.

The total volume of the box is used as a first input, while the percentage of the box volume that contains items is used as a second input. Smaller boxes that contain items generally contain more void volumes that are smaller than the smallest dimension of packing chips. Those smaller void volumes are unlikely to be filled during packing material dispensing. Conversely, as box volume increases, the fraction of void volumes smaller than the smallest dimension of the packing chips decreases. Testing has shown that for any given void volume, as box size decreases, the amount of packing elements required to fill a given void volume also decreases. A box that is mostly filled with a single or several items is more likely to have void areas between items that are not able to be filled by packaging elements. Again, this is because the packing element size is too large to penetrate smaller void volumes. In the case where several items are in the box, there may be void volumes that are entirely unable to be filled because they are between stacked items and, as such, these void volumes are unable to be filled from the top. Testing has shown that, as the amount of volume in a box that is occupied by items increases, the amount of packing to fill a calculated void volume decreases.

The two inputs identified above are then combined through a heuristic model, in one example described as a lookup table, to determine the proper amount of packing elements to be dispensed so that a box is properly filled but not overfilled. A fill factor has been developed which is multiplied by the amount of void volume. In examples, void volume is not detected directly but is calculated by subtracting the measured volume in the box footprint when placed on the conveyor from the total box volume. Alternatively, the void volume may be the difference between the box volume and the volume of the contents therein, if known. The void volume is multiplied by the fill factor to determine the final amount of packing elements to be dispensed for any one box. It should also be noted that the factor used also takes into account the bridging and interlocking nature of the packing elements, which requires further adjustments to the amount of packing elements dispensed for any given void volume calculated. Additionally, the amount of packing elements may be further adjusted based on the nature of the items being packed.

Thus, in a most basic method, calculating packing element requirements for a shipping box may be determined by first determining a volume of a shipping box. This can be performed by any of the systems described herein, e.g., visual or optical scanners, scanned bar code information that includes box size, WMS systems that track the information about specific boxes as they travel through a distribution center, and so on. Via similar systems, the content volume (e.g., the volume taken up by the contents of the box) can be determined. Additionally, a void volume, e.g., the difference between the box volume and the content volume, can also be calculated. At this point, most prior art solutions would simply dispense a volume of packing material equal to the void volume, and would subsequently encounter many of the undesirable situations described above (e.g., overfill).

The technologies described herein, however, utilize further rules and calculations to more accurately determine the amount of packing material to dispense. In an example, the box volume and the content volume are used to determine a filled ratio, which in one example, can be defined by a percentage of the box volume occupied by the content volume. This filled ratio can be contained in a look-up table, along with the total box volume. A representative look-up table is depicted below in Table 1. In examples, look-up tables may be generally specific to the nature of the items being shipped and an average or total number of items in the box. In other examples, a look-up table need not be utilized and the associated ratios and factors can be determined by one or more discrete calculations. The filled ratio and box volume are associated with a void factor. By multiplying the void factor and the determined void volume, the required volume of packing elements are determined. Further, additional rules and calculations can adjust the number of packing elements required based on the specific sizes of contents disposed within the shipping box. For example, it has been discovered that, if the average fill aspect ratio of box contents is high, the void factor is further decreased. To determine the average fill aspect ratio, the largest dimension of an item disposed in the box is divided by the smallest dimension of that item. A high value (e.g., greater than about 4 or 5 in certain cases), will decrease the void factor. The average fill aspect ratio may be determined on a case-by-case basis and may be specific to a particular shipping system or products being shipped. Once the fill volume is known, since the volume of each of the individual packing elements is also known, an expansion machine can dispense the precise amount of packing elements directly into the box, based on the calculations performed. Further calculations may be performed based on the number of items within the shipping box. Thus, the precision available with such a system may, in certain embodiments, entirely obviate the need for a human operator during packing operations.

TABLE 1

Example Look-up Table

| BOX VOLUME | FILLED RATIO | VOID FACTOR |
|---|---|---|
| 0-0.25 CF | 0-25% | 0.70 |
| 0.25-0.50 CF | 0-25% | 0.75 |
| 0.50-1.0 CF | 0-25% | 0.85 |
| Greater than 1.0 CF | 0-25% | 0.90 |
| 0-0.25 CF | 26-50% | 0.65 |
| 0.25-0.50 CF | 26-50% | 0.75 |
| 0.50-1.0 CF | 26-50% | 0.85 |
| Greater than 1.0 CF | 26-50% | 0.90 |
| 0-0.25 CF | 51-75% | 0.60 |
| 0.25-0.50 CF | 51-75% | 0.70 |
| 0.50-1.0 CF | 51-75% | 0.80 |
| Greater than 1.0 CF | 51-75% | 0.90 |
| 0-0.25 CF | 76-100% | 0.50 |
| 0.25-0.50 CF | 76-100% | 0.70 |
| 0.50-1.0 CF | 76-100% | 0.80 |

TABLE 1-continued

Example Look-up Table

| BOX VOLUME | FILLED RATIO | VOID FACTOR |
|---|---|---|
| Greater than 1.0 CF | 76-100% | 0.90 |

Figure 7:
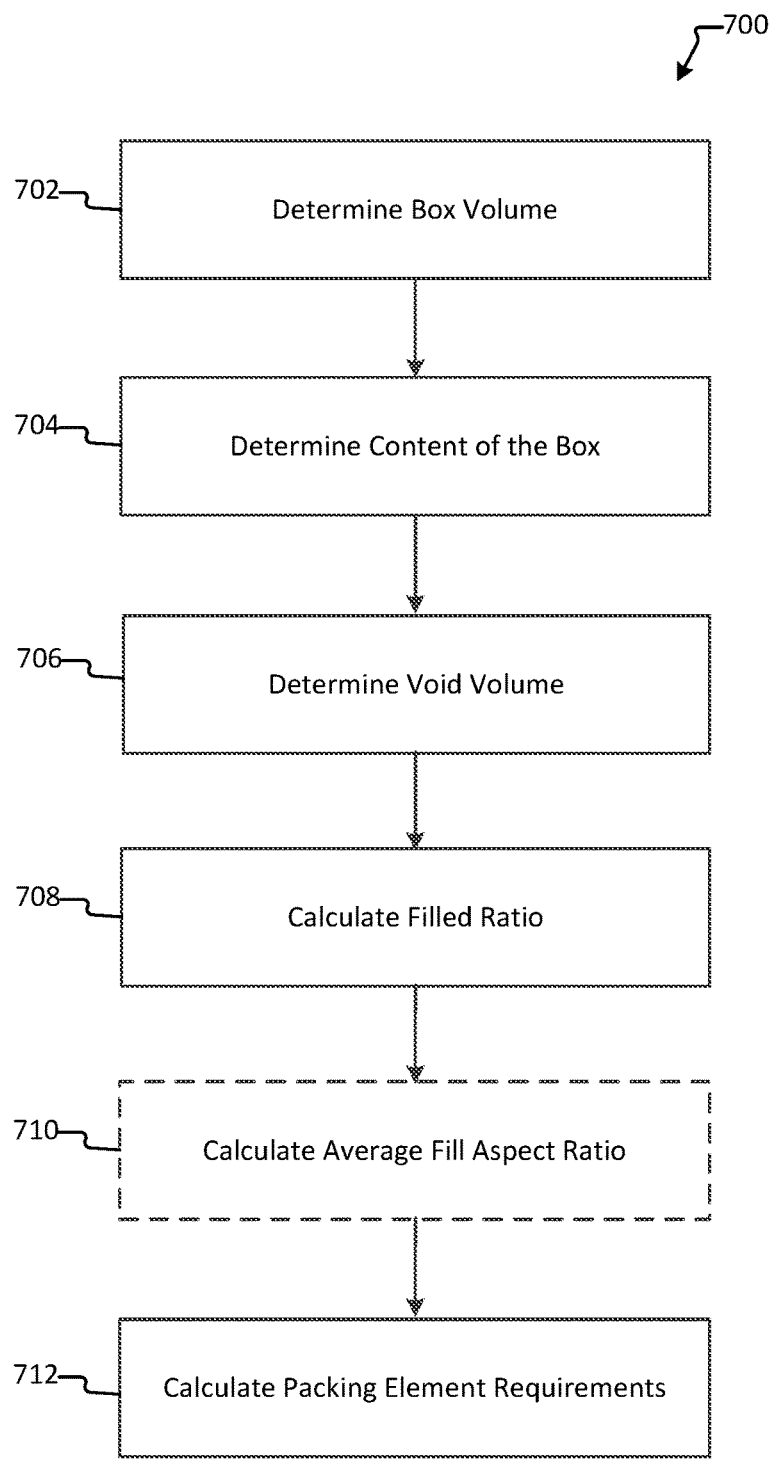
FIG. 7 depicts a method of calculating packing material requirements for a shipping box.

FIG. 7 depicts a method 700 of calculating packing element requirements for a shipping box. The method 700 begins with determining a box volume, operation 702, which may be determined via a barcode scanner, a WMS, box dimensional scanning device, or a combination thereof. In operation 704, the contents of the box are determined. The contents of the box may include any of an inventory of items in the box, a total volume of items, or discrete volumes of individual items. In certain examples, operations 702 and 704 may be combined into a single operation, e.g., if a WMS is utilized. As such, a barcode scanner that scans a barcode located on a box can communicate all of the box contents, contents information (e.g., number and/or dimensions of the individual items that make up the contents), box volume, shipping and customer information, and so on, based on the single scan. With the operations 702 and 704 complete, the void volume may be determined, operation 706, for example, by subtracting the volume of the box contents from the volume of the box. Thereafter, a packing elements fill ratio may be calculated or determined, operation 708, e.g., by utilizing a look-up table, based on both the box volume and the contents volume.

It has been discovered that, for certain box contents, an additional calculation may be performed in order to properly determine the packing element requirements for a particular box and its contents. For example, contents that include high aspect ratio items may require a further reduction in the number of packing elements utilized, as these high aspect ratio items may prevent flow of the packing elements therearound. As such, the method 700 includes utilizing contents information obtained during the contents determination operation 704 to determine whether any high aspect ratio items are located within the box. If so, an average fill aspect ratio may be calculated in operation 710. This calculation may be determined based on testing or modeling, typically at the site of the automated packing equipment, and may be dictated by the number of elements in the box, aspect ratios of the elements, or a combination thereof. Thereafter, the final packing element requirement may be calculated, operation 712. The packing element requirement is typically based at least in part on the void volume, the fill ratio, and the average aspect ratio (if required). Since the volume of each packing element is known, the packing element requirement may include a number of the packing elements. As such, a signal may be sent to a packing element expander to form the required number of packing elements. In an alternative example, since the output of packing elements per angle of rotation is also known, the signal may instead correspond to an angle of rotation of a rotary-type packing element expander required to dispense the desired number of packing elements.

Figure 8:
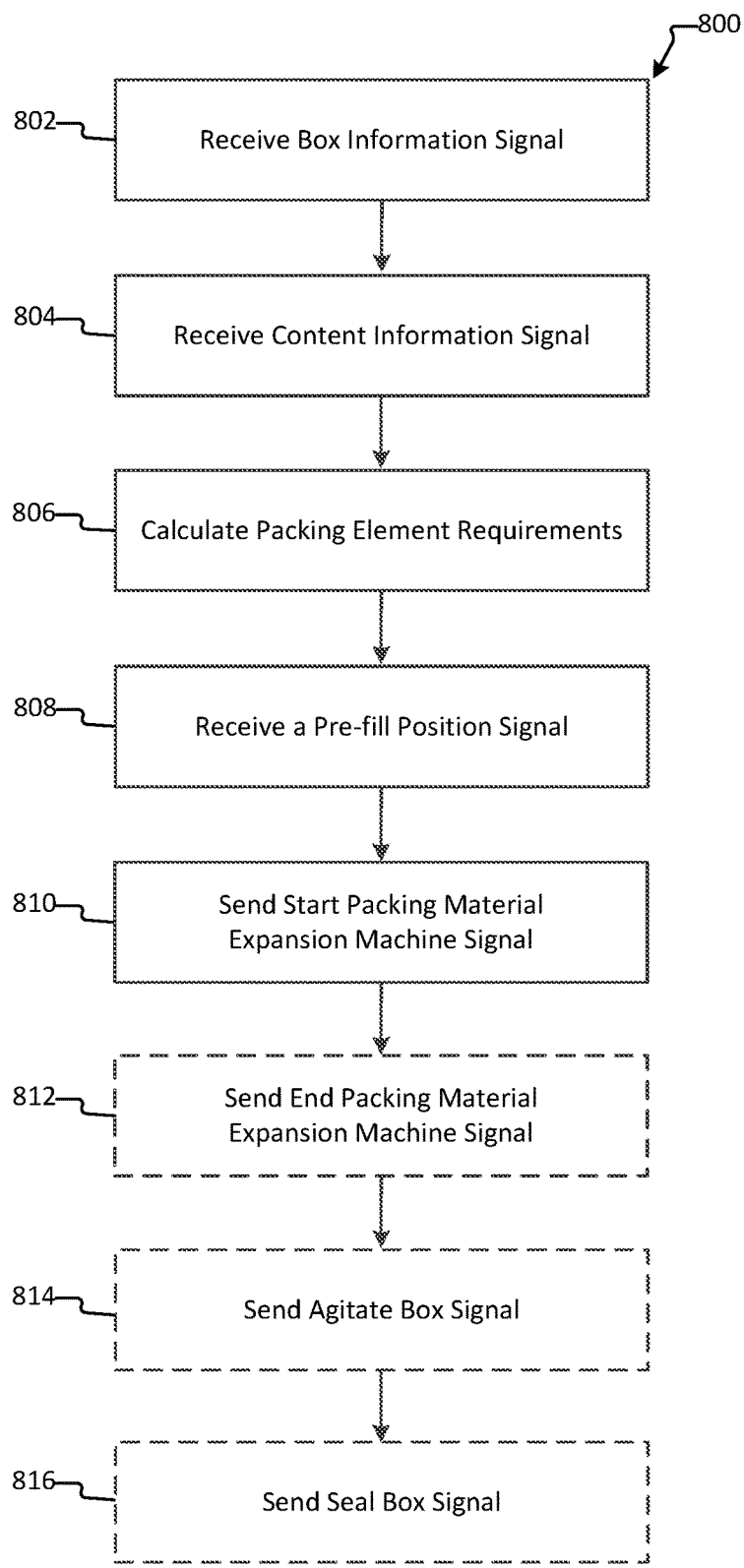
FIG. 8 depicts a method of operating an automated packing system.

FIG. 8 depicts a method 800 of operating an automated packing system for shipping boxes. In examples, this method may be performed by an automated packing system controller, or a control module that operates as part of a WMS. In certain examples, however, the method may be performed by two or more systems that, together, control an automated packing system. The method 800 begins with operation 802, where a box information signal is received. As described above, this information may include box volume information. Operation 804 includes receiving a box content information signal, which may include information as further described above. Additionally, operation 804 can, in certain systems, be combined with the box volume information of operation 803. The information obtained as part of operations 802 and 804 may be utilized to determine packing elements requirements for the box, operation 806. As described above, the packing requirements can be based on the void volume, the fill ratio, an average fill aspect ratio, or other considerations as required, to calculate the required or desired amount of packing elements.

Thereafter, a signal indicative of the box reaching a pre-fill position is received, operation 808. At this point, in order to reduce dwell time of the box in a subsequent fill position, the controller may send a start machine signal to the packing element expansion machine, operation 810, in order to begin operation thereof. This operation may include rotation of a rotary-type expansion machine. Once the required amount of packing material has been expanded and dispensed, an end machine signal that stops operation of the expansion machine may be sent, operation 812. In an alternative example, the start machine signal of operation 810 may include an indication of the length of time, angle or rotation, or other metric by which the machine will be run, thus obviating the need to send the end machine signal of operation 812. Thereafter, the controller may also send signals required to agitate the box, operation 814, and seal the box, operation 816. These signals are entirely optional, as agitation and sealing may occur automatically as the box reaches associated positions in the system, without requiring any instruction from the controller.

Figure 9:
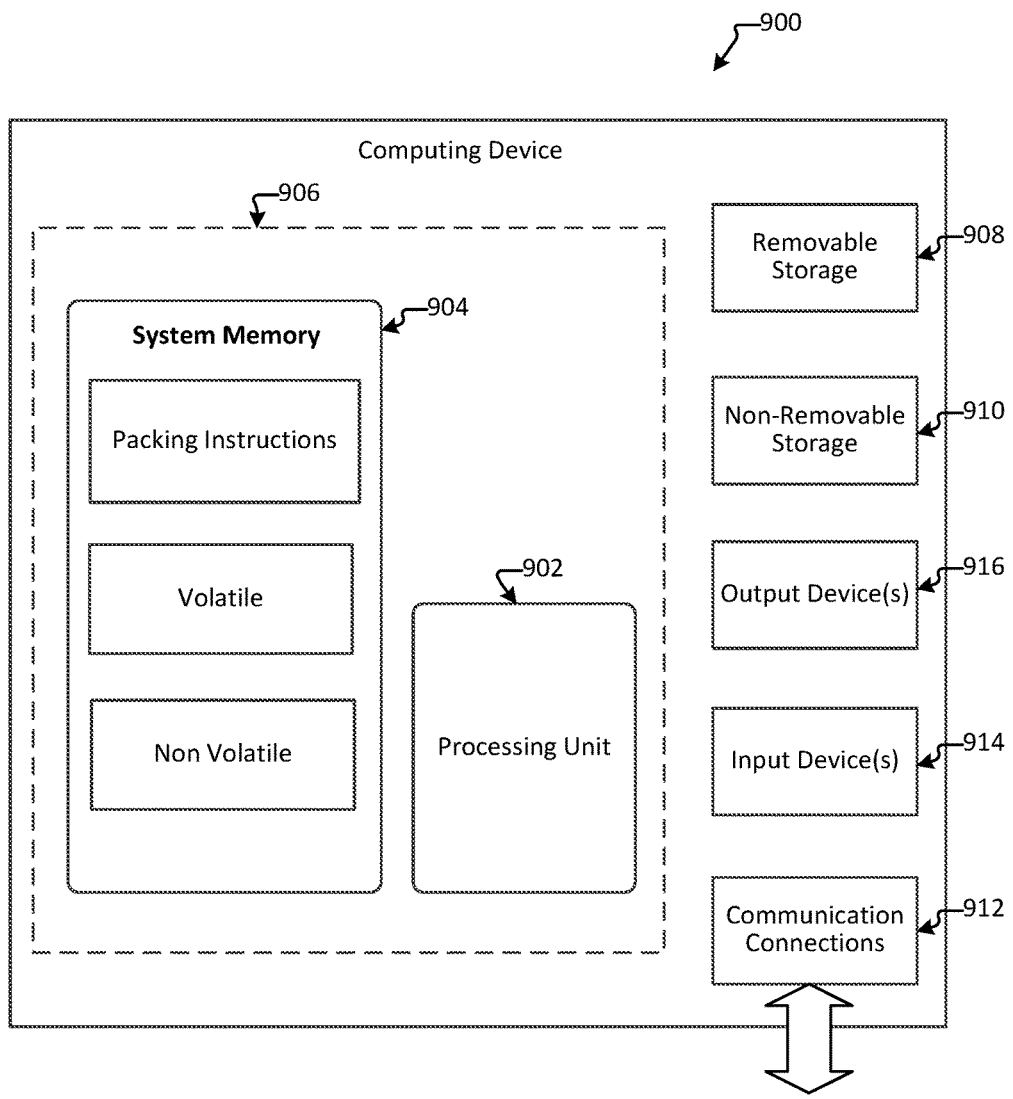
FIG. 9 illustrates one example of a suitable operating environment in which one or more of the present examples may be implemented.

FIG. 9 illustrates one example of a suitable operating environment 900 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, smartphones, tablets, distributed computing environments that include any of the above systems or devices, and the like.

In its most basic configuration, operating environment 900 typically includes at least one processing unit 902 and memory 904. Depending on the exact configuration and type of computing device, memory 904 (storing, among other things, instructions to calculate volumes and expand and dispense packing materials as described herein) may be volatile (such as RAM), non-volatile (such as ROM, flash memory, etc.), or some combination of the two. This most basic configuration is illustrated in FIG. 9 by dashed line 906. Further, environment 900 may also include storage devices (removable, 908, and/or non-removable, 910) including, but not limited to, magnetic or optical disks or tape. Similarly, environment 900 may also have input device (s) 914 such as touch screens, keyboard, mouse, pen, voice input, etc. and/or output device(s) 916 such as a display, speakers, printer, etc. Also included in the environment may be one or more communication connections, 912, such as LAN, WAN, point to point, Bluetooth, RF, etc.

Operating environment 900 typically includes at least some form of computer readable media. Computer readable media can be any available media that can be accessed by processing unit 902 or other devices utilizing the operating environment. By way of example, and not limitation, computer readable media may include computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, solid state storage, or any other medium which can be used to store the desired information. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 900 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

In some embodiments, the components described herein include such modules or instructions executable by computer system 900 that may be stored on computer storage medium and other tangible mediums and transmitted in communication media. Computer storage media includes volatile and non-volatile, removable and non-removable media implemented in any method or technology for storage of information such as computer readable instructions, data structures, program modules, or other data. Combinations of any of the above should also be included within the scope of readable media. In some embodiments, computer system 900 is part of a network that stores data in remote storage media for use by the computer system 900.

Figure 10:
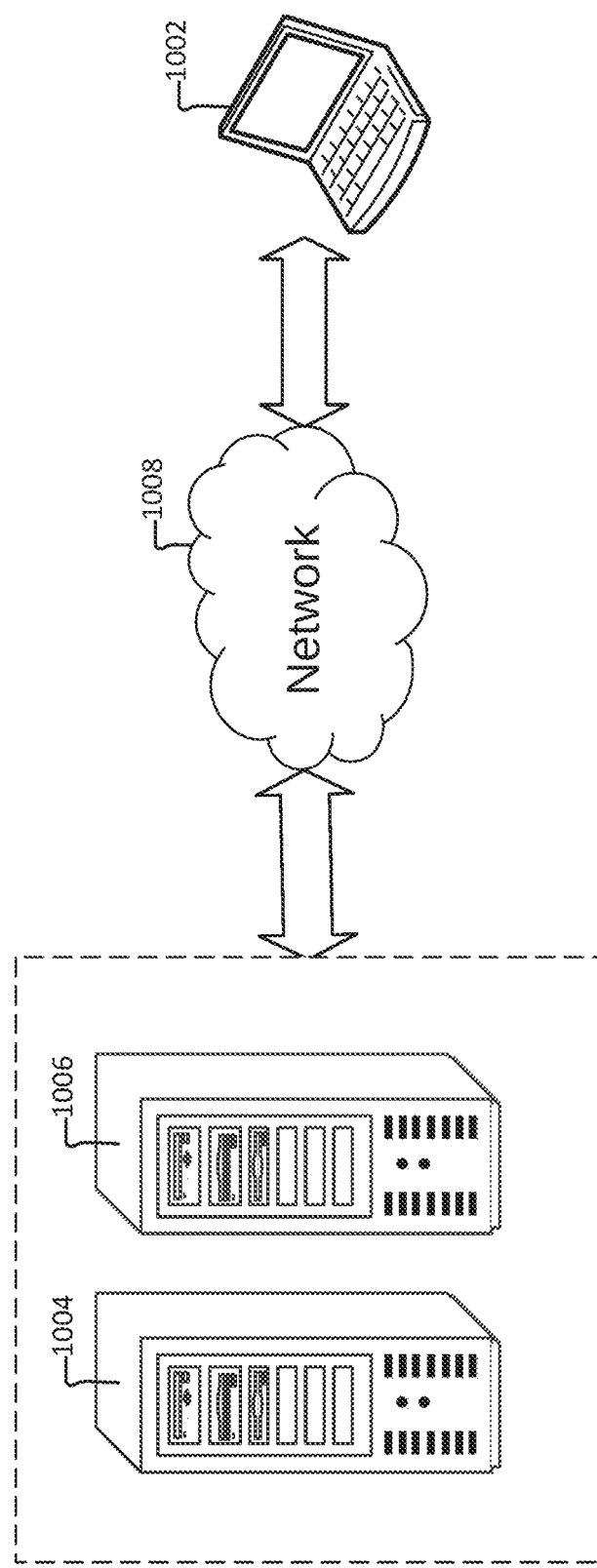
FIG. 10 is an embodiment of a network in which the various systems and methods disclosed herein may operate.

FIG. 10 is an embodiment of a network 1000 in which the various systems and methods disclosed herein may operate. In embodiments, portable device, such as client device 1002, may communicate with one or more servers, such as servers 1004 and 1006, via a network 1008. In embodiments, a client device may be a laptop, a tablet, a personal computer, a smart phone, a PDA, a netbook, or any other type of computing device, including individual controllers for various components of the packing system, and the computing device in FIG. 9. In embodiments, servers 1004 and 1006 may be any type of computing device, such as the computing device illustrated in FIG. 9. Network 1008 may be any type of network capable of facilitating communications between the client device and one or more servers 1004 and 1006. Examples of such networks include, but are not limited to, LANs, WANs, cellular networks, and/or the Internet.

In embodiments, the various systems and methods disclosed herein may be performed by one or more server devices. For example, in one embodiment, a single server, such as server 1004 may be employed to perform the systems and methods disclosed herein. Portable device 1002 may interact with server 1004 via network 1008 in send testing results from the device being tested for analysis or storage. In further embodiments, the portable device 1002 may also perform functionality disclosed herein, such as by collecting and analyzing testing data.

In alternate embodiments, the methods and systems disclosed herein may be performed using a distributed computing network, or a cloud network. In such embodiments, the methods and systems disclosed herein may be performed by two or more servers, such as servers 1004 and 1006. Although a particular network embodiment is disclosed herein, one of skill in the art will appreciate that the systems and methods disclosed herein may be performed using other types of networks and/or network configurations.

The embodiments described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure.

While there have been described herein what are to be considered exemplary and preferred embodiments of the present technology, other modifications of the technology will become apparent to those skilled in the art from the teachings herein. The particular methods of manufacture and geometries disclosed herein are exemplary in nature and are not to be considered limiting. It is therefore desired to be secured all such modifications as fall within the spirit and scope of the technology. Accordingly, what is desired to be secured by Letters Patent is the technology as defined and differentiated herein, and all equivalents.

What is claimed is:

1. A method of packing a container with a packing system, the method comprising:
   providing a scanner for determining at least one of a volume of the container and a volume of a content of the container;
   determining the volume of the container;
   determining the volume of the content of the container;
   subtracting the volume of content of the container from the volume of the container to determine a void volume;
   identifying a packing element size of a packing element;
   determining a filled ratio by dividing the volume of the content of the container by the volume of the container;
   autonomously obtaining a void factor, wherein the void factor is associated with a portion of the void volume that is smaller than the packing element size, and wherein the void factor is a number less than 1.0;
   calculating an average fill aspect ratio based on a largest dimension of the content divided by a smallest dimension of the content and decreasing the void factor if the calculated average fill aspect ratio is greater than about 4; and
   multiplying the void factor by the void volume to obtain a packing element volume requirement less than the void volume.

2. The method of claim 1, wherein the packing element volume requirement comprises an angle of rotation of a rotary packing element expander.

3. The method of claim 1, wherein the packing element volume requirement comprises a number of linear oscillations of a reciprocating packing element expander.

4. The method of claim 1, wherein the packing element volume requirement is calculated as a number of packing elements having the packing element size.

5. The method of claim 1, wherein the content of the container comprises at least one of (a) a number of elements with the container and (b) a volume of elements within the container.

6. The method of claim 5, wherein the void volume is based at least in part on a difference between (a) the volume of the container and (b) the volume of elements within the container.

7. The method of claim 1, wherein the container is a box.

8. The method of claim 1, further comprising calculating at least one of a pre-contents requirement and a post-vibration requirement of the container.

9. The method of claim 1, further comprising:
receiving a container pre-fill position signal from a pre-fill detector of the packing system when the container is in a pre-fill position in the packing system, wherein the pre-fill position is distinct from a fill position on the packing system; and
sending a start machine signal based at least in part on the container pre-fill position signal.

10. The method of claim 9, further comprising sending an agitate signature to a vibrating station operable to settle packing elements in the container.

11. The method of claim 9, wherein the start machine signal is configured to initiate rotation of a rotary packing element expander.

12. The method of claim 9, further comprising sending a seal signal to a sealing station operable to seal the container.

13. The method of claim 1, wherein the void factor is obtained from a lookup table based at least in part on the filled ratio and the volume of the container.

14. A system of packing a container, the system comprising:
at least one processor; and
memory encoding computer executable instructions that, when executed by the at least one processor, performing a method comprising:
determining a volume of the container;
determining a volume of a content of the container;
subtracting the volume of the content of the container from the volume of the container to determine a void volume;
identifying a packing element size of a packing element;
determining a filled ratio by dividing the volume of the content of the container by the volume of the container;
autonomously obtaining a void factor, wherein the void factor is associated with a portion of the void volume that is smaller than the packing element size, and wherein the void factor is a number less than 1.0;
calculating an average fill aspect ratio based on a largest dimension of the content divided by a smallest dimension of the content and decreasing the void factor if the calculated average fill aspect ratio is greater than about 4;
multiplying the void factor by the void volume to obtain a packing element volume requirement less than the void volume;
calculating a packing element dispensing requirement based on the packing element volume requirement, wherein the packing element dispensing requirement comprising a plurality of flat packing elements; and
folding the plurality of flat packing elements into folded packing elements and delivering the folded packing elements to the container.

15. The system of claim 14, wherein the content of the container comprises at least one of (a) a number of elements with the container and (b) a volume of elements within the container.

16. The system of claim 15, wherein the void volume is based at least in part on a difference between (a) the volume of the container and (b) the volume of elements within the container.

17. The system of claim 14, wherein the container is a box.

18. The system of claim 14, wherein the void factor is obtained from a lookup table based at least in part on the filled ratio and the volume of the container.

* * * * *